United States Patent [19]

Ratcliff

[11] Patent Number: 4,953,138

[45] Date of Patent: Aug. 28, 1990

[54] ENHANCING SEISMIC REFLECTION EVENTS

[75] Inventor: Davis W. Ratcliff, New Orleans, La.

[73] Assignee: Amoco Corporation, Chicago, Ill.

[21] Appl. No.: 372,975

[22] Filed: Jun. 28, 1989

[51] Int. Cl.⁵ .............................................. G01V 1/28
[52] U.S. Cl. ......................................... 367/43; 367/47
[58] Field of Search ....................... 367/38, 43, 47, 63, 367/21, 24, 53; 364/421

[56] References Cited

U.S. PATENT DOCUMENTS 4,312,050 1/1982 Lucas .................................... 367/44

Primary Examiner—Ian J. Lobo
Attorney, Agent, or Firm—F. E. Hook; T. D. Stanley

[57] ABSTRACT

Seismic reflection events are enhanced by separating the events from seismic data, increasing the amplitude of the events, and adding the events back into the seismic data.

9 Claims, 6 Drawing Sheets

ENHANCING SEISMIC REFLECTION EVENTS

BACKGROUND OF THE INVENTION

The processing of seismic data by combining seismic traces to produce a stacked seismic section can attenuate seismic reflection events that represent reflections from subsurface structures. Normal moveout and dip moveout programs are used in an attempt to stack seismic traces without attenuating seismic reflection events. However, the model of the earth employed for these programs is not always accurate and seismic reflection events can be attenuated.

Seismic reflection events associated with the steeply sloping sides of salt domes and faults having angles of 50° or more have been found to have been attenuated. Other seismic reflection events can also be attenuated during the stacking of seismic traces. The images of these attenuated events on a seismic section may not provide sufficient detail for making informed decisions concerning subsurface structures.

It has now been discovered that seismic reflection events that appear on a stacked seismic section to have been attenuated can be enhanced. This enhancement is conducted in a manner such that the seismic reflection events are not otherwise altered and such that an analyst can attain an improved understanding of subsurface structures.

SUMMARY OF THE INVENTION

A seismic reflection event is enhanced in accordance with the method of this invention by separating the event from seismic data, increasing the amplitude of the event, and adding the event back into the seismic data. This compensates for any attenuation of the seismic reflection event that may have occurred during the acquisition or processing of the seismic data or that may have resulted from the characteristics of the earth.

A seismic data analyst can perform the method of this invention by first identifying one or a plurality of events on a seismic data display that appears to have been attenuated and selecting time-space windows on the display that encompass the attenuated events. The analyst then applies multichannel seismic data filters to the seismic data for passing all events within the time-space windows and rejecting all events outside the time-space windows. The analyst empirically determines the level of enhancement required for eliminating the attenuation and then increases the amplitude of the passed events. The addition of the passed events back into the seismic data substantially increases the intensity of the image of the events.

Migration of seismic data can make it difficult to produce distinct images of attenuated seismic reflection events; therefore, it has been found that it is beneficial to use the method of this invention prior to migration.

BRIEF DESCRIPTION OF THE DRAWINGS

FIGS. 1 and 2 respectively illustrate stacked and stacked and migrated seismic sections prior to enhancing seismic reflection events associated with the sloping sides of a salt dome. FIG. 3 illustrates enhanced seismic reflection events associated with the sloping sides of a salt dome. FIGS. 4 and 5, respectively, illustrate stacked and stacked and migrated seismic sections after enhancement of seismic reflection events associated with the sloping sides of a salt dome.

DETAILED DESCRIPTION

Seismic reflection events can be enhanced in accordance with the method of this invention by separating the seismic reflection events from the seismic data, increasing the amplitude of the seismic reflection events, and adding the seismic reflection events back into the seismic data. The result of performing the method of this invention is illustrated in FIGS. 1, 2, 3, 4, and 5, with respect to seismic reflection events associated with the sides of a salt dome.

Figure 1:
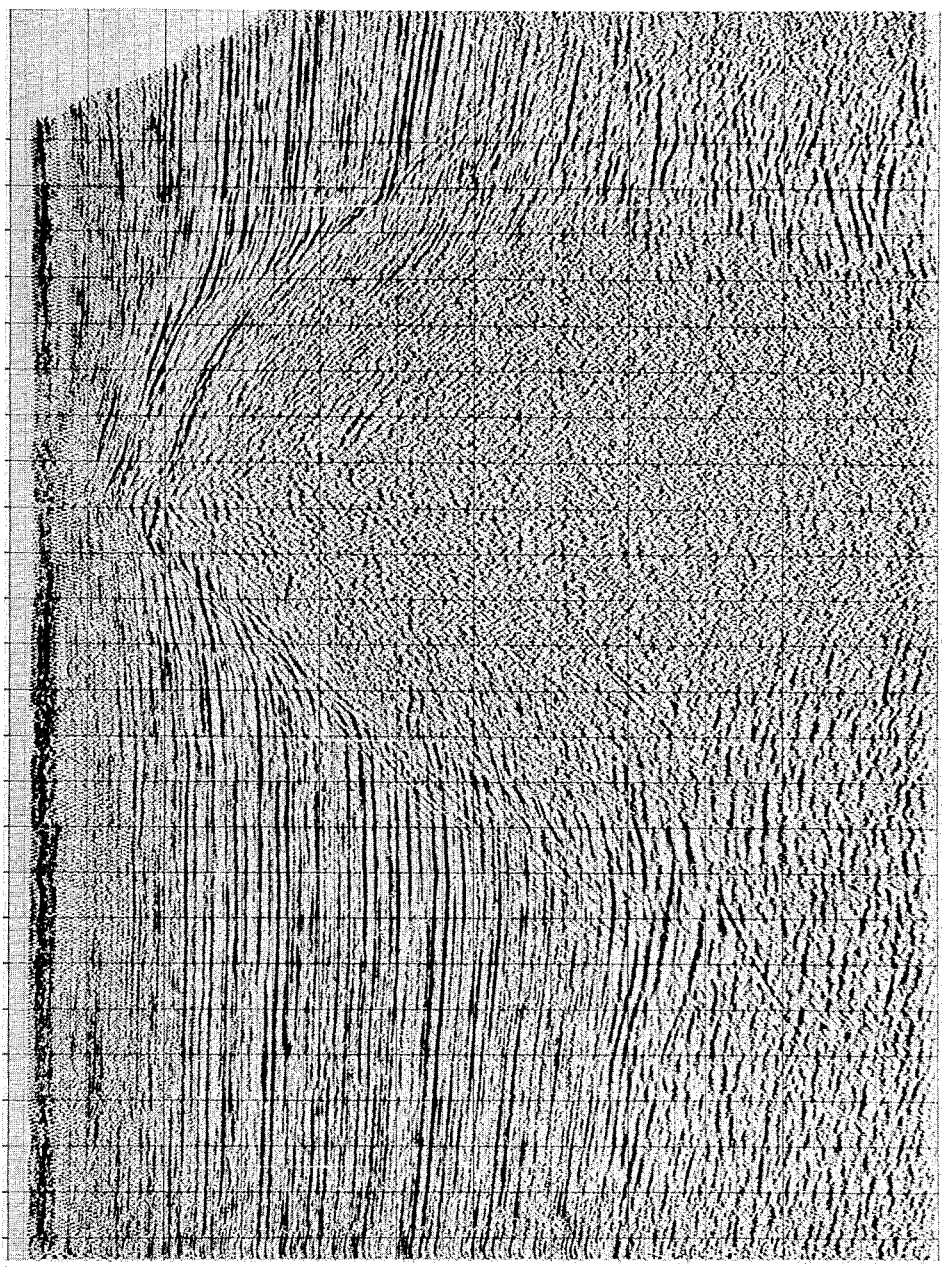
FIGS. 1, 2, 3, 4, and 5 illustrate the enhancement of seismic reflection events associated with the sloping sides of a salt dome.
Figure 2:
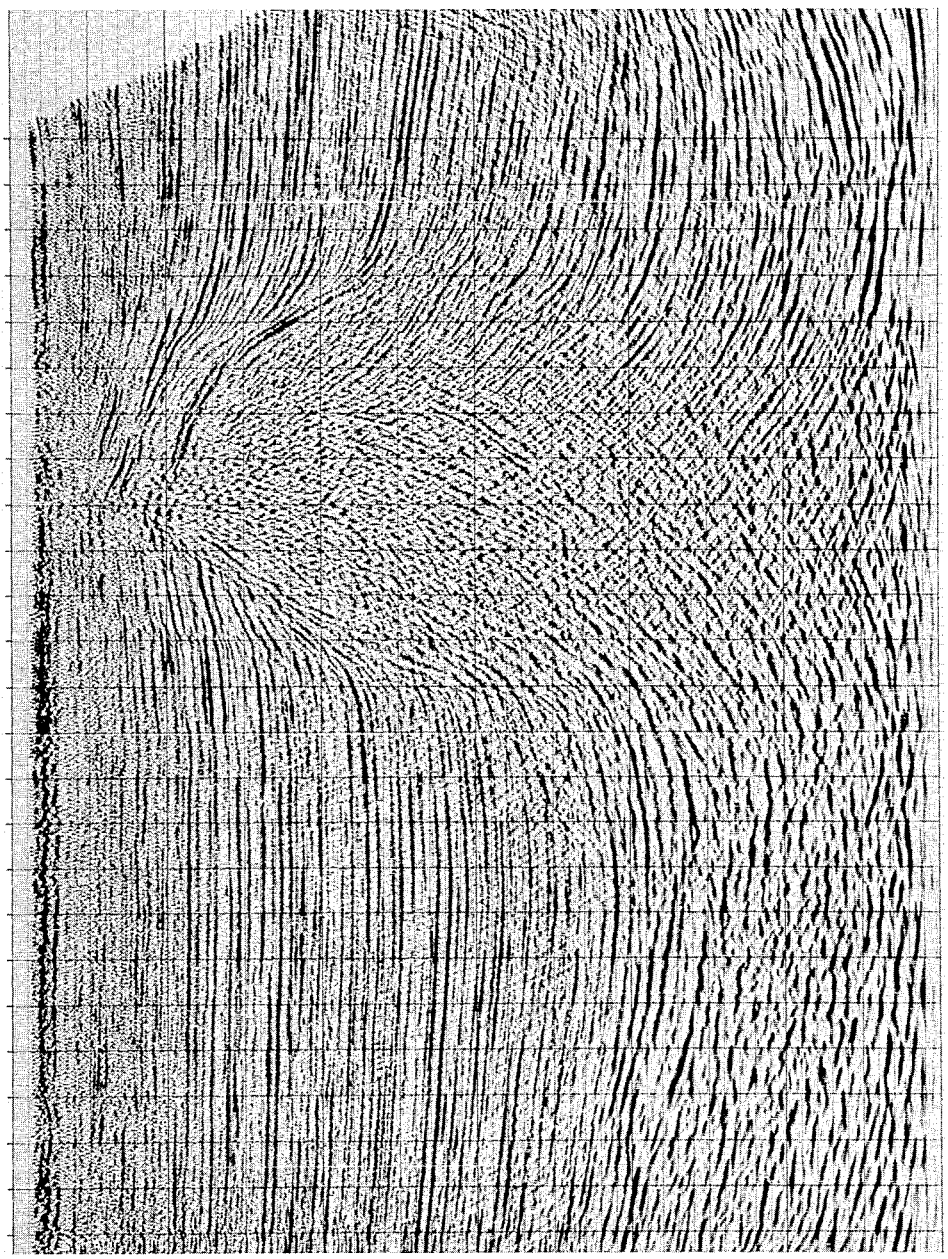

The stacked seismic section on FIG. 1 shows a salt dome with steeply sloping sides. The seismic reflection events associated with the sloping sides of the salt dome appear to be attenuated with depth. These attenuated seismic reflection events are difficult to image after the sloping sides of the salt dome are migrated by moving them to their supposedly true subsurface locations. This is illustrated by comparing seismic reflection events associated with the salt dome on the stacked seismic section of FIG. 1 with the stacked and migrated section of FIG. 2.

Figure 3:
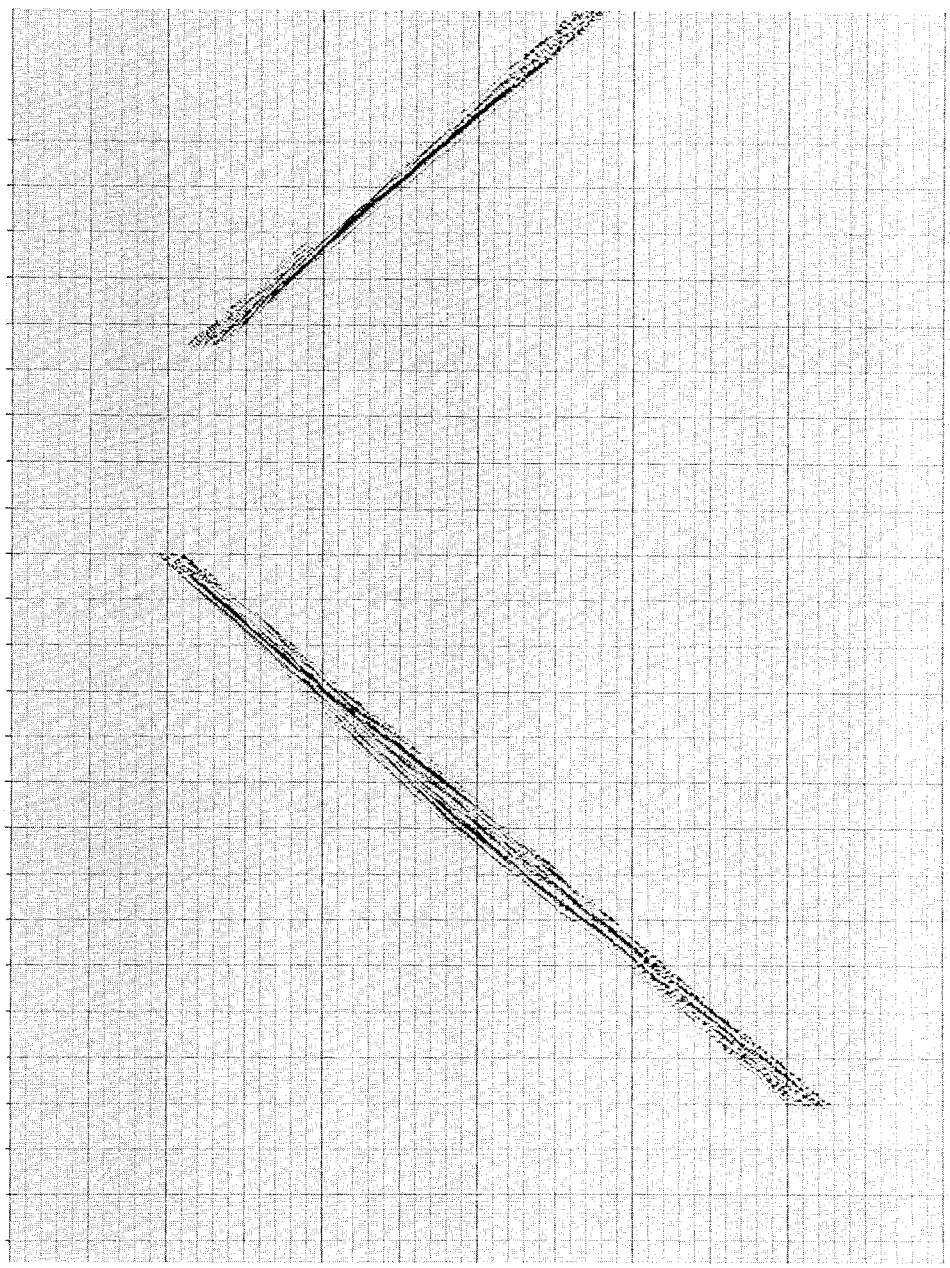
Figure 4:
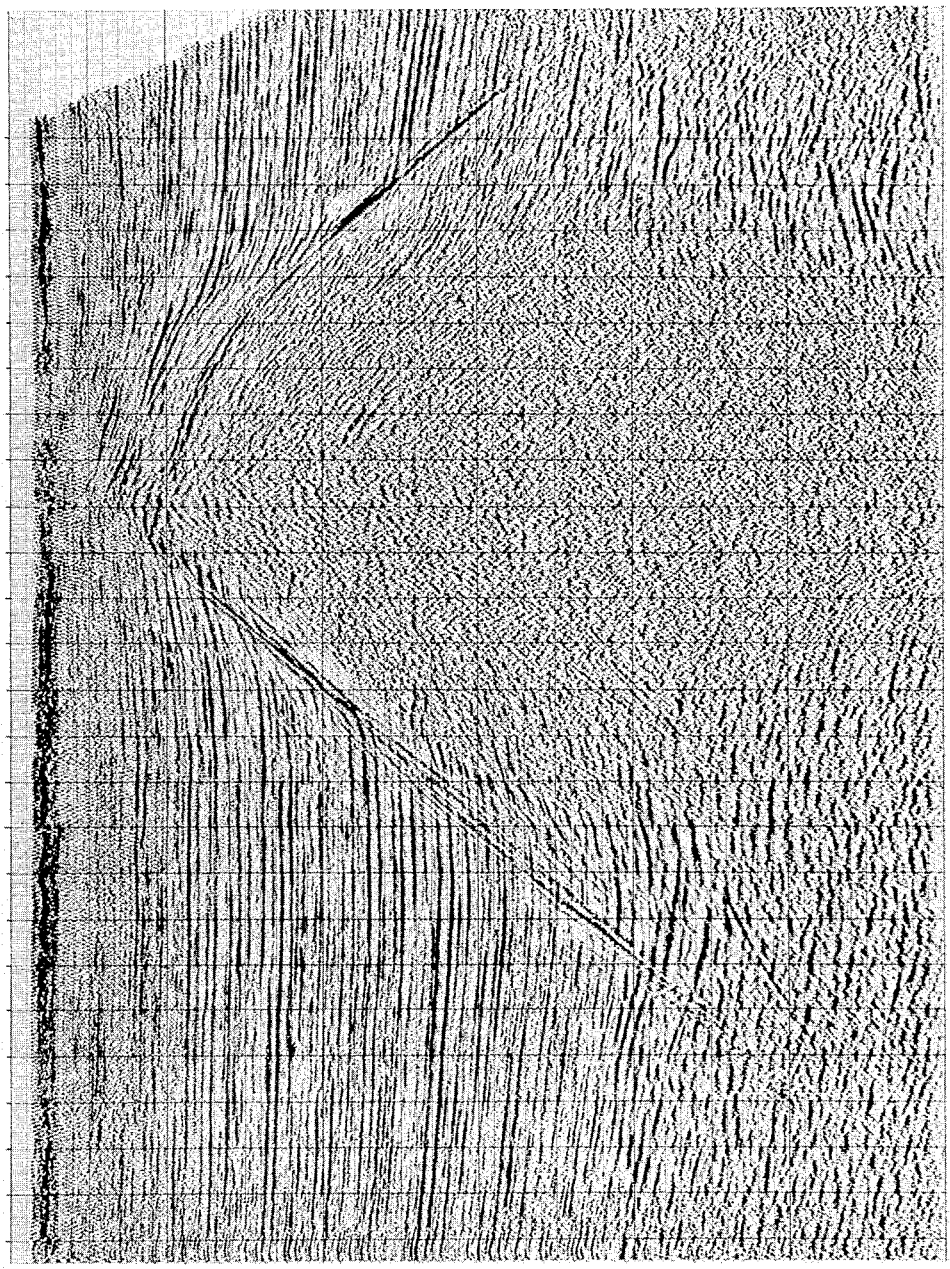

Enhanced seismic reflection events associated with the sides of the salt dome of FIG. 1 are shown on FIG. 3. These events were separated by the use of a multichannel seismic data filter and the level of enhancement was empirically determined. By increasing the amplitude of the separated events by a factor of 3 and adding seismic events associated with the sides of the salt dome appear to be imaged to deeper depths on the stacked seismic section of FIG. 4 and on the stacked and migrated seismic section of FIG. 5 than on respective FIGS. 1 and 2. The migration was conducted after the enhanced events were added to the stacked seismic section.

Figure 5:
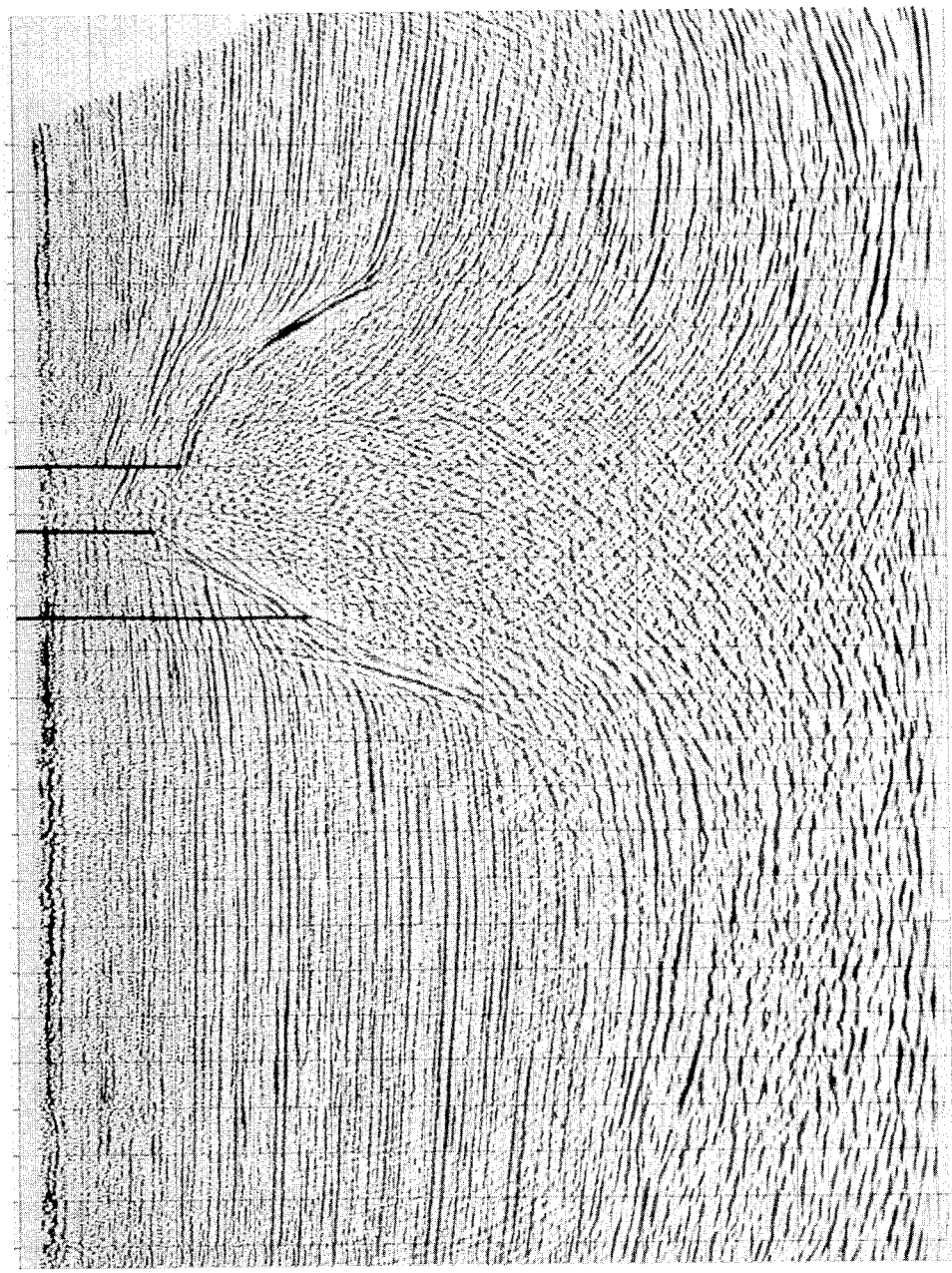

The wells shown on FIG. 5 were drilled prior to the processing of the seismic data to produce the seismic sections shown on FIGS. 1, 2, 3, 4 and 5. These wells encountered salt at the depths shown on FIG. 5. The significance of having well-defined images of seismic reflection events when selecting the locations for oil and gas wells is illustrated on FIG. 5.

Figure 6:
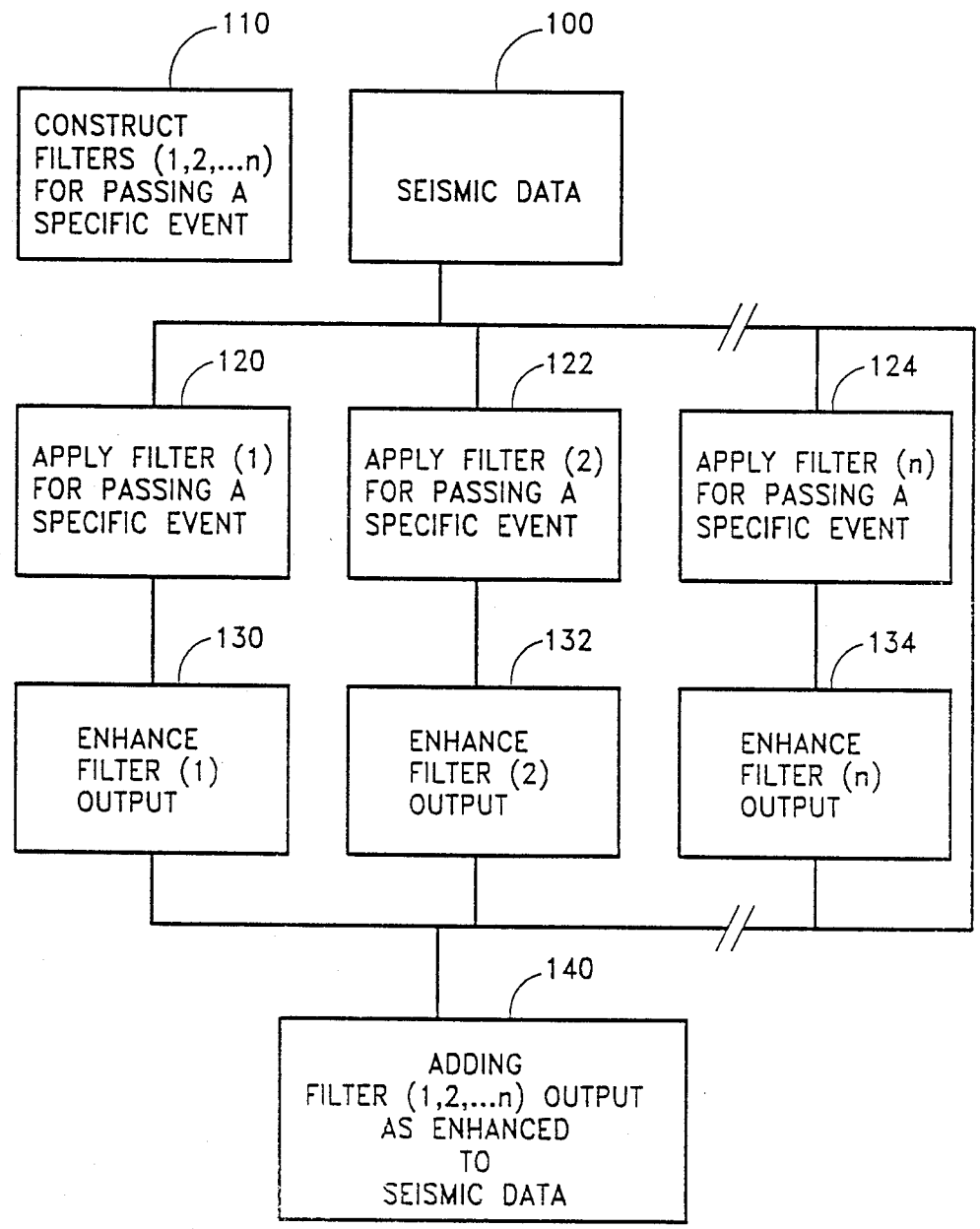
FIG. 6 illustrates an approach for enhancing seismic reflection events in accordance with the method of this invention.

A flow chart is shown on FIG. 6 to illustrate a method of this invention for enhancing seismic reflection events. Events that appear to have been attenuated are identified on seismic data displays 100 and filters are constructed 110 for separating the events from the seismic data.

The separation of events that are to be enhanced can be accomplished with multichannel seismic data filters that are constructed for passing all events within time-space windows on a display of seismic data and rejecting all events outside the time-space windows. The multichannel filters described by E. Cassano and F. Rocca in "After-Stack Multichannel Filters Without Mixing Effects," Vol. 22, Geophysical Prospecting, (1974), pp. 330–340, are particularly well adapted for accomplishing this separation.

The use of a plurality of filters 120, 122 and 124 is shown on FIG. 6. The seismic data analyst, in accordance with this invention, could select one or a plurality of seismic reflection events that appear to have been attenuated. The analyst would then construct and apply an appropriate number of filters for separating the events from the seismic data.

The seismic data analyst would empirically determine the level of enhancement required for producing a desired image of the seismic reflection event. The seismic reflection event is then enhanced 130, 132, and 134 by increasing the amplitude of the seismic reflection event. The enhanced seismic reflection event is then added 140 back into the seismic section.

While this invention has been described with a certain degree of particularity, it is to be limited only by the scope of the claims.

What is claimed is:

1. A method for enhancing selected attenuated seismic reflection events, in seismic data, representative of sloping formations and faults in the earth's subsurface, comprising:
   (a) separating said selected attenuated seismic reflection events from the seismic data;
   (b) increasing the amplitude of the attenuated seismic reflection events, and
   (c) combining the increased seismic reflection events with the seismic data for obtaining an enhanced structural image of sloping formations and faults in the earth's subsurface.

2. The method of claim 1, wherein separating, increasing and combining are undertaken prior to migrating the seismic data.

3. The method of claim 1, wherein the selected attenuated seismic reflection events are separated by:
   (a) defining a time-space window which encompasses the selected attenuated seismic reflection events; and
   (b) applying a multichannel filter to the seismic data for passing seismic reflection events within the time-space window and for rejecting seismic reflection events outside the time-space window.

4. The method of claim 3, wherein the amplitude of the selected attenuated seismic reflection events are increased by an empirically determined amount.

5. The method of claim 1, wherein the combined seismic data and enhanced seismic reflection events are migrated for obtaining migrated seismic sections having an enhanced structural image of sloping formations and faults in the earth's subsurface.

6. The method of claim 1, wherein the attenuated seismic reflection events are selected from stacked seismic sections of the seismic data.

7. A method for enhancing attenuated seismic reflection events, in seismic data, representative of sloping formations and faults in the earth's subsurface formations, comprising:
   (a) defining time-space windows encompassing said selected attenuated seismic reflection events therein;
   applying a multichannel filter to the seismic data for passing the selected seismic reflection events within the time-space window of the seismic data;
   (c) multiplying the amplitude of the passed seismic reflection events by an empirically determined amount; and
   (d) combining the multiplied seismic reflection events with the seismic data for obtaining an enhanced structural image of sloping formations and faults in the earth's subsurface.

8. The method of claim 7, wherein the combined seismic data having multiplied seismic reflection events are migrated for obtaining seismic sections having enhanced structural images of sloping formations and faults in the earth's subsurface.

9. The method of claim 8, wherein the sloping formations and faults have angles of at least 50°.

* * * * *

UNITED STATES PATENT AND TRADEMARK OFFICE
CERTIFICATE OF CORRECTION

PATENT NO. : 4,953,138

DATED : August 28, 1990

INVENTOR(S) : Davis W. Ratcliff

It is certified that error appears in the above--identified patent and that said Letters Patent is hereby corrected as shown below:

Column 2, line 33, after "adding" insert --the enhanced events to the stacked seismic section, the--.

Column 3, line 23
Claim 1, line 8, "," should read --;--.

Column 4, line 21
Claim 7, line 8, in front of "applying" insert --(b)--.

Signed and Sealed this

Fourteenth Day of January, 1992

Attest:

HARRY F. MANBECK, JR.

*Attesting Officer*      *Commissioner of Patents and Trademarks*